US011461855B1

(12) United States Patent
Reynolds et al.

(10) Patent No.: US 11,461,855 B1
(45) Date of Patent: *Oct. 4, 2022

(54) LOCATIONAL VISUALIZATION OF FINANCIAL STATEMENTS

(71) Applicant: United Services Automobile Association (USAA), San Antonio, TX (US)

(72) Inventors: Clint James Reynolds, San Antonio, TX (US); Jeff Pollack, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/936,338

(22) Filed: Jul. 22, 2020

Related U.S. Application Data

(63) Continuation of application No. 12/500,866, filed on Jul. 10, 2009, now Pat. No. 10,748,222.

(51) Int. Cl.
*G06Q 40/00* (2012.01)
*G06Q 40/02* (2012.01)

(52) U.S. Cl.
CPC ........... *G06Q 40/125* (2013.12); *G06Q 40/02* (2013.01)

(58) Field of Classification Search
CPC ....... G06Q 40/00; G06Q 40/125; G06Q 40/02
See application file for complete search history.

(56) References Cited

U.S. PATENT DOCUMENTS

| 6,240,360 | B1 | 5/2001 | Phelan |
|---|---|---|---|
| 6,883,708 | B1 | 4/2005 | Fieldler et al. |
| 10,748,222 | B1 | 8/2020 | Reynolds et al. |
| 2005/0086612 | A1 | 4/2005 | Gettman et al. |
| 2005/0160002 | A1 | 7/2005 | Roetter et al. |
| 2006/0026170 | A1 | 2/2006 | Kreitler et al. |
| 2006/0085275 | A1 | 4/2006 | Stokes et al. |
| 2008/0082415 | A1 | 4/2008 | Shastry |
| 2008/0294512 | A1 | 11/2008 | Gussoni |
| 2009/0089254 | A1 | 4/2009 | Von Kaenel et al. |
| 2009/0204454 | A1 | 8/2009 | Lagudi |
| 2009/0327134 | A1 | 12/2009 | Carlson et al. |

(Continued)

FOREIGN PATENT DOCUMENTS

CN 102024041 A * 4/2011

OTHER PUBLICATIONS

[PDF] Digital map online R Rakkeitwinai—2005—repository.au.edu (Year: 2005).*

(Continued)

*Primary Examiner* — Lalita M Hamilton
(74) *Attorney, Agent, or Firm* — Perkins Coie LLP

(57) ABSTRACT

Methods and systems for locational visualization of financial statements are described. In an example, a method may receive, in a financial institution system, a request to display a record associated with a financial transaction, determine a location of a merchant associated with the financial transaction using merchant information, request, from an online mapping service, a customizable map interface associated with the location of the merchant, receive the customizable map interface, and display the customizable map interface integrated into the record associated with the financial transaction.

20 Claims, 10 Drawing Sheets

(56) References Cited

U.S. PATENT DOCUMENTS

| | | |
|---|---|---|
| 2010/0010889 A1 | 1/2010 | Antonucci |
| 2012/0197757 A1 | 8/2012 | Ajala |
| 2015/0310564 A1 | 10/2015 | Peterson |
| 2020/0090217 A1 | 3/2020 | Poole et al. |

OTHER PUBLICATIONS

GeoPortals.com Launches Network for Savvy Internet Users, PR Newswire, New York, Jul. 21, 1999.
U.S. Appl. No. 12/500,866, filed Jul. 10, 2009, Locational Visualization of Financial Statements.

* cited by examiner

LOCATIONAL VISUALIZATION OF FINANCIAL STATEMENTS

CROSS REFERENCE TO RELATED APPLICATIONS

This application is a continuation of U.S. patent application Ser. No. 12/500,866, entitled "LOCATIONAL VISUALIZATION OF FINANCIAL STATEMENTS," filed on Jul. 10, 2009, now allowed, the entire contents of which is hereby incorporated by reference for all purposes.

FIELD

This application relates to methods and systems for locational visualization of financial statements and, more particularly, to mapping of financial statement records to geographical locations.

BACKGROUND

A customer can regularly review his financial statements, such as a credit card statement, for discrepancies and fraudulent charges. For each transaction, a financial statement can list the name of the other party to the transaction, such as a name of a merchant. Sometimes, a customer cannot recall a particular transaction because, for example, the name of the merchant is not recognizable. Therefore, information provided in the financial statement can be insufficient for a customer to recollect the details of the particular transaction. While most of the financial transactions are legitimate, an uncertainty may result in excessive querying of the customer support.

SUMMARY

This summary is provided to introduce a selection of concepts in a simplified form. These concepts are further described below within the detailed description. This summary is not intended to identify key or essential features, nor is it intended to be used as an aid in determining the scope of the claimed subject matter.

In an example, a computerized method, and system for performing the method, can include receiving, in a financial institution system, a request to display one or more records associated with a financial statement determining a location of a merchant associated with the financial statement using merchant information requesting, from a web mapping service, an interactive map associated with the location of the merchant, receiving the interactive map including a street view of the merchant, and displaying the record associated with the financial statement accompanied by the map displaying the street view of the merchant. The method may include utilizing an Application Programming Interface (API) of the mapping service to enable changing a view mode of the interactive map. The method can include obtaining the location of the merchant from data transmitted by the merchant. The method can include determining of the location of the merchant by determining that a party to the financial statement is an online payment service and requesting the online payment service to provide the address of the merchant using a code associated with the financial statement. The method can include obtaining the location of the merchant from the merchant location database. The method can include determining that the location is associated with more than one merchant, and using the determination, displaying the map in a virtual space mode. The method can include displaying a bill payment record within the financial statement. The method can include obtaining the location of the merchant using an Internet Protocol (IP) associated with the merchant, the location being provided by an IP mapping service. The method can allow a user to disable the map's functionality.

In an example, a computerized method, and system for performing said method, can include receiving, in a financial institution system, a request to display a record associated with a financial statement, the record including merchant information, determining a location of the merchant, and an image of an item associated with the financial statement using financial statement data, requesting, from a web mapping service, an interactive map associated with the location of the merchant, receiving the interactive map displaying a street view of the merchant, and displaying the record associated with the financial statement, the record including the map and the image of the item. The method can comprise of obtaining the image of the item using a Universal Product Code (UPC) of the item. The method can also include the provision of the image of the item as an overlay of the map. The method can include providing a Merchant Category Code (MCC) as an overlay of the map.

In an example, a computerized method, and system for performing the method, can comprise receiving, in a financial institution system, a request to display a record associated with a financial statement, the record including merchant information of a merchant, and displaying the record associated with the financial statement and an image associated with the merchant, the image being displayed as a part of a paid advertisement arrangement with the merchant.

In an example, a computerized method, and system for performing the method, can include receiving, in a financial institution system, a request to display a record associated with a financial statement, the record including merchant information of a merchant, determining, that the merchant is an online merchant, and displaying the record associated with the financial statement with an image associated with the merchant, the image being a hyperlink to a website associated with the merchant. The method can include a determination that the merchant is an online merchant using a database of online merchants. The method can include a logo associated with the merchant, or a view of a corporate building as the merchant image.

In further examples, the above methods steps are stored on a machine-readable medium comprising instructions, which when implemented by one or more processors, perform the steps. In examples, subsystems or devices can be adapted to perform the recited steps. Other features, examples, and embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
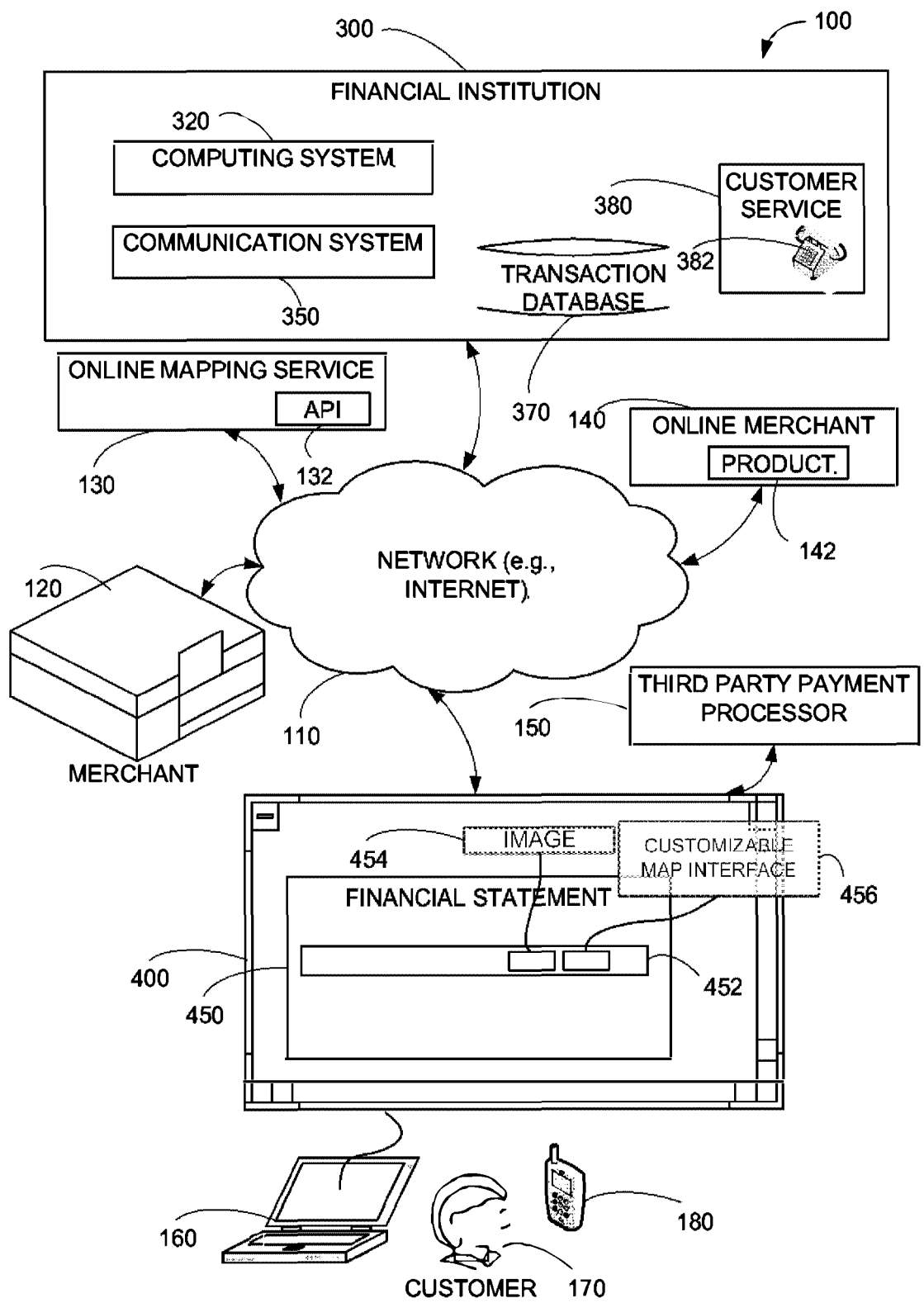
FIG. 1 is a schematic diagram showing an environment within which systems and methods are implemented according an example embodiment.

Example methods and systems for locational visualization of financial statements are described. In the following description, for purposes of explanation, numerous specific details are set forth in order to provide a thorough understanding of example embodiments. It will be evident, however, to one skilled in the art, that the present invention may be practiced without these specific details.

Reviewing financial statements, either online or in paper form, is one way that customers can check for discrepancies and fraudulent transactions. However, the details provided in the financial statements can be insufficient remind the customers the exact details of the transaction. For example, the details may state that the transaction has occurred at a store identified by a certain number but because the store can have multiple locations, the location of the transaction is not readily ascertainable.

The methods and systems described herein enable deriving a location from the details included in a financial statement. In some example embodiments, the location can be derived from data sources other than the details of the financial statement, either internal or external with respect to the financial institution. Based on the location, a customizable map interface can be presented to the user where the location is the focal point. The interactive map interface can show the physical representation of the merchant associated with location. For example, the interactive map interface can show the location as a view from the street. The user can be allowed to interact with the customizable map interface and change the view.

In some example embodiments, where the details do not include the location of the merchant, the transaction details can be retrieved and used as an input into a merchant database. The merchant database can then return a location associated with the merchant. The merchant location can be used to present a customizable map interface showing a physical representation of the merchant (e.g., a street view). To present the customizable map interface, a web mapping service (e.g., street view of Google Maps) can be used. In some situations, a street view can be inadequate to show the physical representation of the merchant. Thus, in the case of multiple merchants located inside a single structure (e.g., a shopping mall), a street view of the structure does not provide a view of a specific merchant inside the structure. Therefore, other physical representations, such as virtual spaces, can be used. The virtual spaces may show a virtual representation of the merchant located inside the structure. By viewing the physical representation, the customer can easily verify validity of the transaction. This can greatly reduce the number of telephone calls in which a customer is querying for more information about a transaction. In further embodiments, visualizations of other transaction related data can be provided. Thus, images of the merchant's logo and/or the products associated with the transaction can presented in the financial statement.

FIG. 1 illustrates a schematic diagram showing environment 100 within which systems and methods for locational visualization of financial statements can be implemented, in accordance with an example embodiment. The example environment 100 can include a financial institution 300 (e.g., a retail bank, a virtual bank, a credit union). The financial institution 300 may provide online banking. The online banking can allow customers to view their financial statements on a secure website. In some example embodiments, the financial statement is a credit and/or debit card statement. The financial institution can include a computing system 320 and a communication system 350. The computing system 320 can include various subsystems described below with reference to FIG. 3. The communication system 350 can include, but is not limited to, wireless telephone systems, e.g., PCS, GSM, TDMA, or CDMA telephones, satellite phones, computer connections, data lines, facsimile machines, and copiers.

The financial institution 300 can include a transaction database 370 and a customer service 380. The transaction database 370 stores the data for the financial institution and can include magnetic storage, optical storage, or electronic storage of data. The transaction database 370 can store transaction information, which can include, but is not limited to, transaction data supplied by merchants. The transaction database 370 may also include data related to the financial transactions obtained from other sources (e.g., a merchant database). The customer service 380 can be a department of the financial institution 300 having various responsibilities related to interactions with the customers. The customer service 380 can be handling customers' queries related to validity of the financial transactions. The customer service 380 can employ persons (e.g., sales and service representatives) or use an automated means called self-service.

A customer 170 can call a telephone 382 of the customer service 380 to inquire about a particular transaction. For example, the customer 170 can call the telephone 382 when the customer cannot recollect a certain transaction in order to determine the validity of a transaction. The methods and systems for locational visualization of financial transactions can allow the customer 170 to view the physical representation of the merchant associated with a particular transaction, thereby reducing the number of telephone calls received by the customer service 380.

The example environment 100 can include a merchant 120 (e.g., a grocery store) and/or an online merchant 140 (e.g., an online electronics store). With the popularity of the Internet rapidly increasing, many traditional "brick and mortar" merchants have opened online counterparts. Thus, in some example embodiments, the merchant 120 can also be the online merchant 140.

The example environment 100 can include a third party payment processor 150. The third party payment processor 150 can be an e-commerce business allowing payments and money transfers to be made through the Internet. While facilitating online payment transactions, the third party payment processor 150 can further obscure the circumstances surrounding the transaction because the financial statement includes the name of the third party payment processor 150 and not the name of the merchant 120 as a party to the transaction. In some example embodiments, the computing system 320 can request the third party payment processor 150 or an affiliate to provide additional transaction.

The example environment 100 can include an online mapping service 130. The online mapping service 130 can generate and deliver customizable map interfaces upon a request. The online mapping service 130 can include an API 132 to allow developers to integrate the customizable map interface generated by the online mapping service 130 into third party websites with their own data points. By using the API 132, the customizable map interface 456 can be integrated into the financial statement 450. The API 132 may enable various features related to the customizable map interface 456, such as street view of the merchant 120. The street view can include horizontal and vertical panoramic views from a row of positions along the street.

The example environment 100 can include the user 170. The user 170 can use a computer 160 to view the financial statement 450 via a graphical user interface (GUI) 400. The financial statement 450 may include a summary of all financial statements occurring over a given period on an account. The account can be a deposit account and/or a credit card account, or any other type of account offered by the financial institution 300. The financial statement 450 can include transaction records 452. The transaction records 452 can include transaction details and the customizable map interface 456 using or based on the location of the merchant associated with the transaction.

The example environment 100 can include a network 110. The network 110 is preferably the Internet, but can be any network capable of communicating data between devices can be used with the present system. In addition to the Internet, suitable networks can also include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), and/or a frame relay connection. Other example networks include an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications can also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

Figure 2:
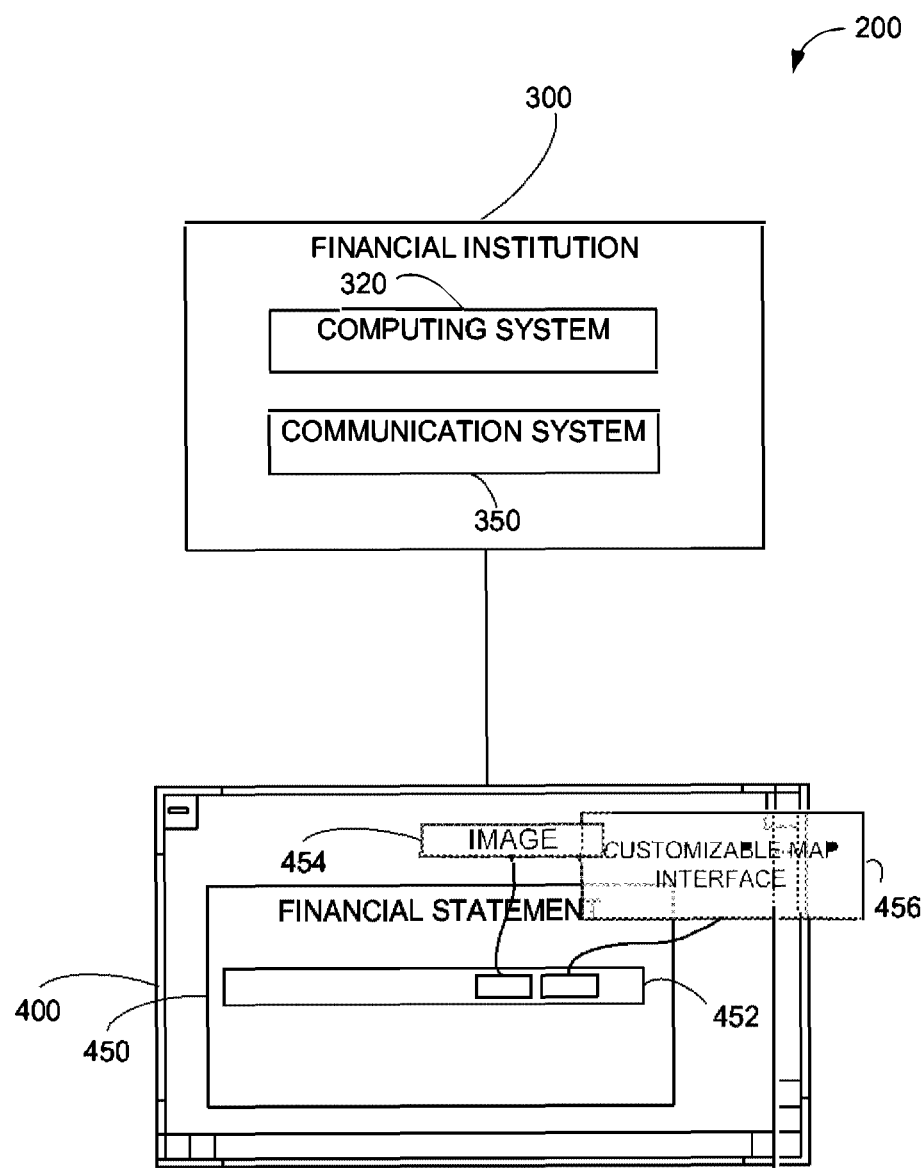
FIG. 2 is a schematic diagram of a system according to an example embodiment.
Figure 3:
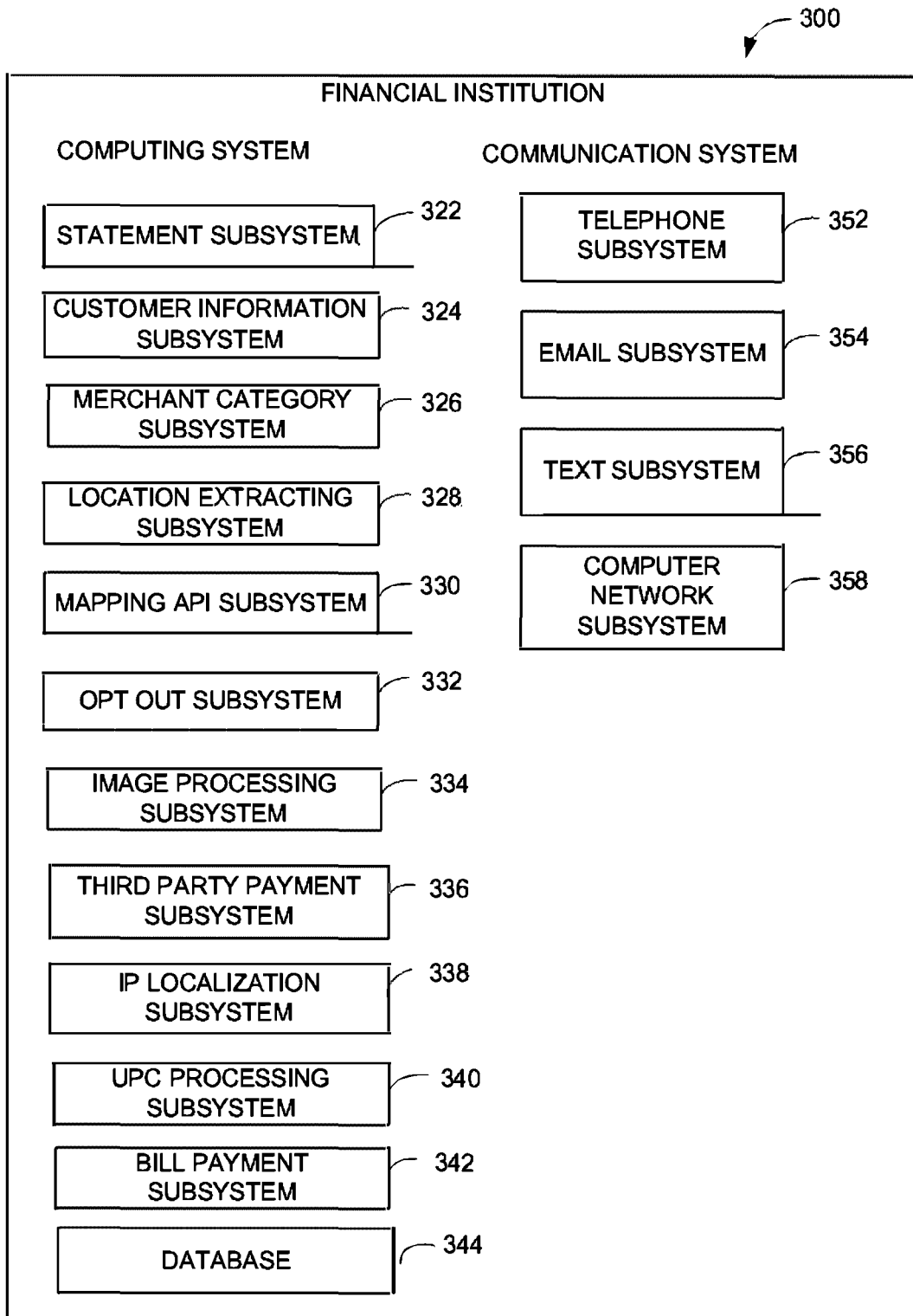
FIG. 3 is a schematic diagram of a financial institution computing and communication system according to an example embodiment.

FIG. 2 illustrates a schematic diagram of the financial institution 300 and the financial statement 400, according to an example embodiment. FIG. 3 illustrates a schematic diagram of the computing system 320 and the communication system 350 according to an example embodiment including various devices and subsystems of the financial institution 300. The computing system 320 and the communication system 350 can each include a plurality of subsystems that are information handling systems that execute processes and perform operations (e.g., processing or communicating information) in response thereto, as discussed further below. Each such subsystem is formed by various electronic circuitry components. In an example, any of the components of the computing machine 1100 (FIG. 11) can be included in a subsystem. The subsystems can each communicate with each other over a bus system (not shown).

The computing system 320 may include a statement subsystem 322, a customer information subsystem 324, a merchant category subsystem 326, a location extracting subsystem 328, a mapping API subsystem 330, an opt out subsystem 332, an image processing subsystem 334, a third party payment subsystem 336, an IP localization subsystem 338, a UPC processing subsystem 340, a bill payment subsystem 342, and a database 344. The operations of these subsystems are explained in more detail within the context of example methods described below.

A telephone subsystem 352 includes devices that can communicate thorough telephone systems, e.g., those based on "plain old telephone service" (POTS), Public Switched Telephone Network (PSTN), voice over IP (VOIP), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, and others. The telephone subsystem 331 can be used for communications between the customer 170 and the customer service 380.

An email subsystem 354 includes devices and systems that can send email communications between the customer 170 and the customer service 380.

A text subsystem 356 includes devices and systems that can send electronic text communications between the customer 170 and the customer service 380. A computer network subsystem 358 includes devices and systems that interface with other computer networks.

Figure 4:
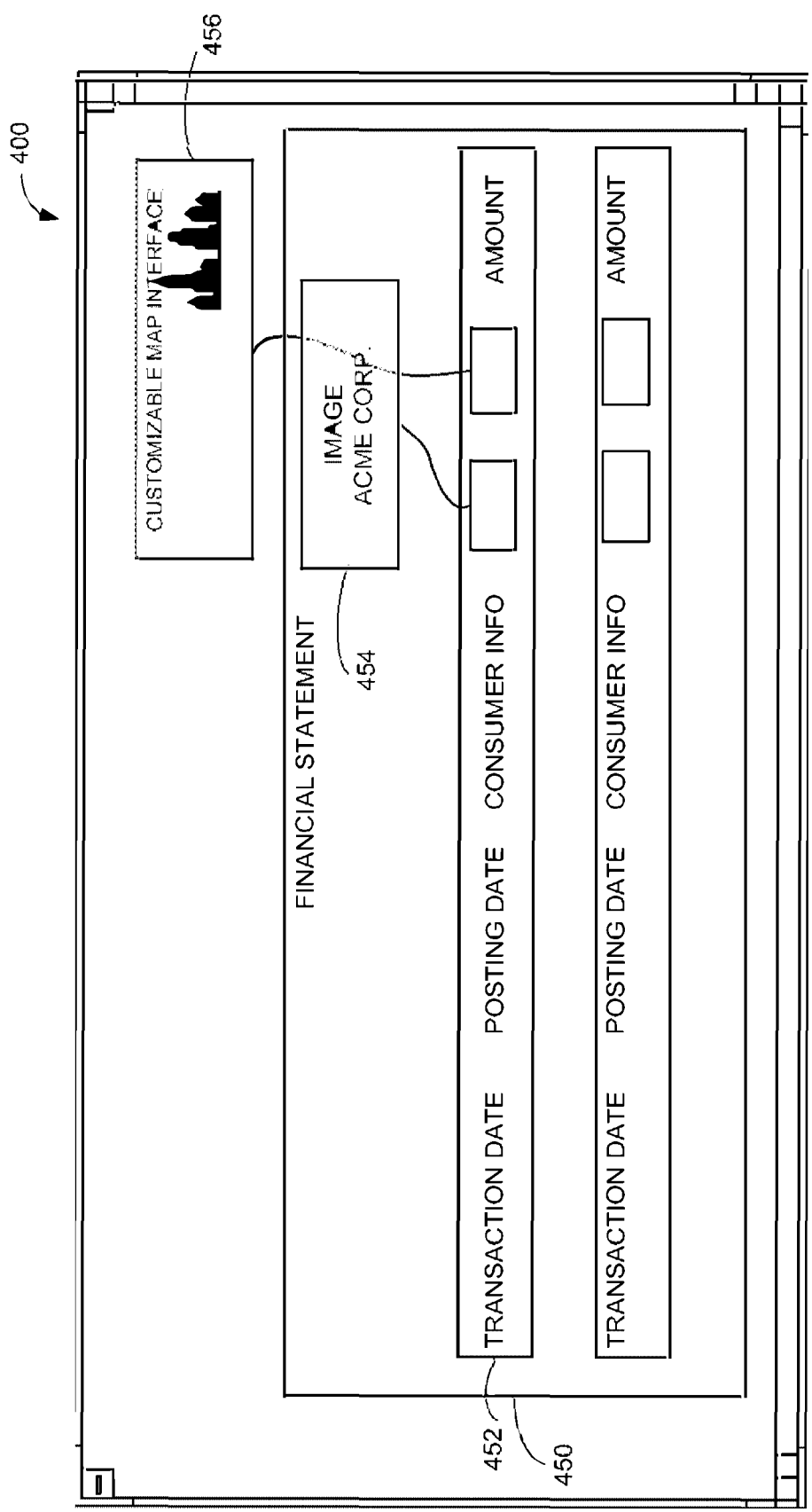
FIG. 4 is a schematic diagram of a financial report according to an example embodiment.

FIG. 4 illustrates a schematic diagram of the financial statement 450 according to an example embodiment. As shown in the FIG. 4, the financial statement 450 can include records having fields such as a transaction date, a posting data, consumer info, and an amount. The customizable map interface 456 can be added to the records 452 to allow the user viewing the physical location associated with the transaction. In some example embodiments, one or more image 454 can be added to the records 452 either instead of or in addition to the customizable map interface 456. The one or more image 454 can include a product associated with the transaction, a logo associated with the merchant 120, or a view of a corporate office of the merchant 120.

Figure 5:
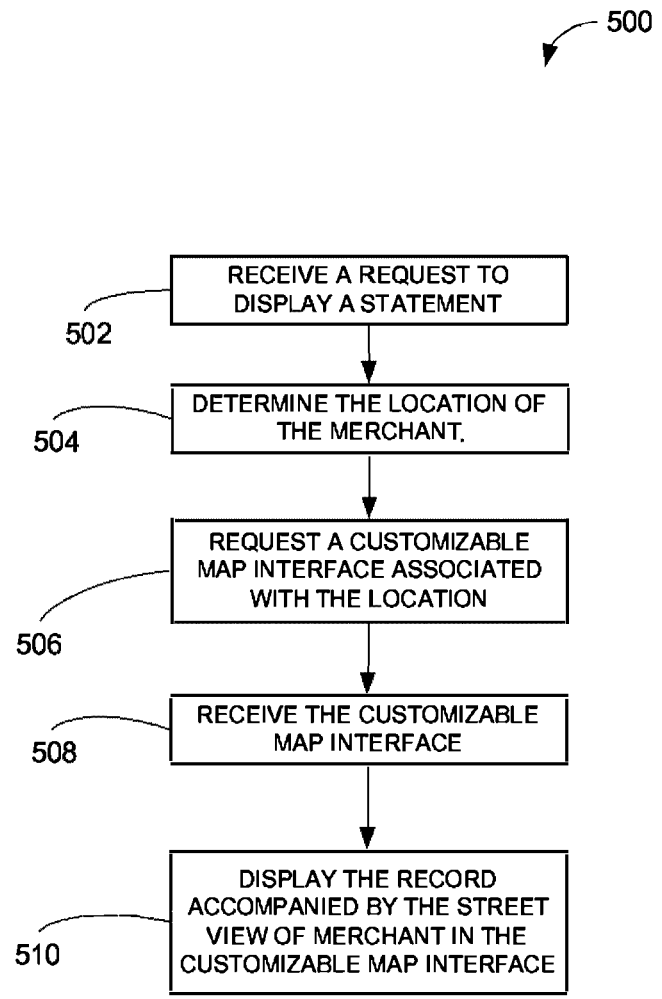
FIG. 5 is a flow chart of a method according to an example embodiment.

FIG. 5 illustrates a flow chart of a method 500 for locational visualization of financial statements. As already mentioned above, the customer 170 may not be able to recognize a transaction in the financial statement 450. To help the customer recollect the circumstances surrounding the transaction, the financial statement 450 can include additional transaction details (e.g., an address of the merchant) either listed directly in the financial statement 450 or accessible via a hyperlink. The additional details may be extracted from the information provided by the merchant 120 or obtained from a third party. However, even the additional details may fail to identify the transaction to the customer's satisfaction, meaning that the customer may still not be aware of the location of the merchant 120.

The method 500 can commence at 502, with the statement subsystem 322 receiving a financial statement. The financial statement 450 can be related to credit and/or debit card transactions but can also include other transactions, such as a bill payment or an insurance claim.

At 504, the location extracting subsystem 328 can determine the location of the merchant 120 associated with the financial statement record 452 using the merchant information located in the additional details. Alternatively, the merchant location can be derived by the location extracting subsystem 328 from the data transmitted by the merchant upon additional request. In the case of the third party payment processor 150, the merchant location can be determined by the third party payment subsystem 336 using data received from the third party payment processor 150 or its affiliate. The financial statement 450 can have a code associated with the third party payment processor charge. The third party payment processor 150 or its affiliate can be used to provide the data using a code associated with the transaction. In some example embodiments, an attempt can be made to obtain the merchant location using an Internet Protocol (IP) (if available) associated with the merchant. The IP localization subsystem 338 can use a GEO IP address look service to map the IP to the merchant location.

As already mentioned above, the online mapping service 130 can include the API 132, which can provide map, street, and a satellite views for each location that has an address. Thus, at 506, the mapping API subsystem 330 can request, from the online mapping service 130, the customizable map interface 456 associated with the merchant location. Where the merchant 120 can have multiple locations, the location can be obtained from a merchant location database.

At 508, the mapping API subsystem 330 can receive the customizable map interface 456, preferably in the street view mode with the merchant location being the focal point, and at 510, the statement subsystem 322 can display the financial statement record 452 associated with the financial transaction. The financial statement record 452 can include the customizable map interface 456 showing the merchant location as seen from the street. Where it is determined that the merchant location is also associated with other merchants, the customizable map interface can be displayed in a virtual space mode. The user 170 can be allowed to change the mode in which the customizable map interface 456 is viewed. The user 170 can also be allowed to use other functionalities of the customizable map interface 456 available via the API 132.

In some example embodiments, the customizable map interface 456 is not provided when the merchant location cannot be derived from the transaction details. In other example embodiments, the merchant location can be derived from the transaction database 370 or external data sources (not shown) using the merchant name. The click-path of the customer 170 can be recorded by the customer information subsystem 324 in order to determine the use and efficiency of the customizable map interface 456. The database 344 can used to store data in which merchants are assigned locations and/or images. The data can be later reused for the same or different customers. A questionnaire can be included to receive customer feedback with respect to the efficiency of the customizable map interface 456. A sample questionnaire can ask the customer 170 to rate his experience. In the case where the customer 170 is not willing the customizable map interface 456 to display the merchant location due to privacy or other concerns, the opt-out subsystem 332 can permit the user 170 to disable the customizable map interface 456.

Figure 6:
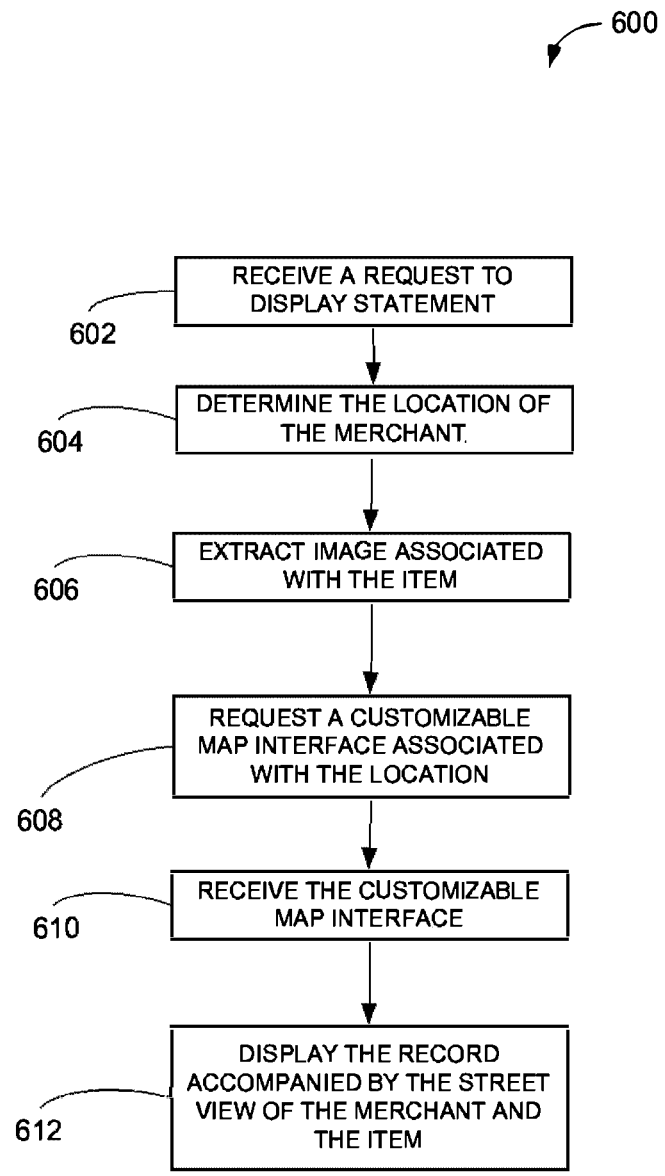
FIG. 6 is a flow chart of a method according to an example embodiment.

FIG. 6 illustrates a flow chart of the method 600 for locational visualization of financial statements. The method may commence at 602 with the statement subsystem 322 receiving a request to display a record associated with a financial statement, the record including the merchant information. At 604, the location extracting subsystem 328 can extract the location of the merchant 120 from the financial statement data. At 606, the image processing subsystem 334 can processes an image associated with the merchant 120. The image of the item can be determined using a Universal Product Code (UPC) of the product or provided by the merchant 120. At 608, the mapping API subsystem 330 can request the customizable map interface 456 associated with the merchant location. At 610, the mapping API subsystem 330 can receive the customizable map interface 456 and at 612, the statement subsystem 322 can display the customizable map interface 456 integrated into the financial statement record 452. The customizable map interface 456 can be displayed in the street view. The image 454 can be displayed as an overlay of the customizable map interface 456. In some example embodiments, the merchant's line of business can also be displayed. The merchant's line of business can be derived by the merchant category subsystem 326 from a Merchant Category Code (MCC) included in the transaction data.

Figure 7:
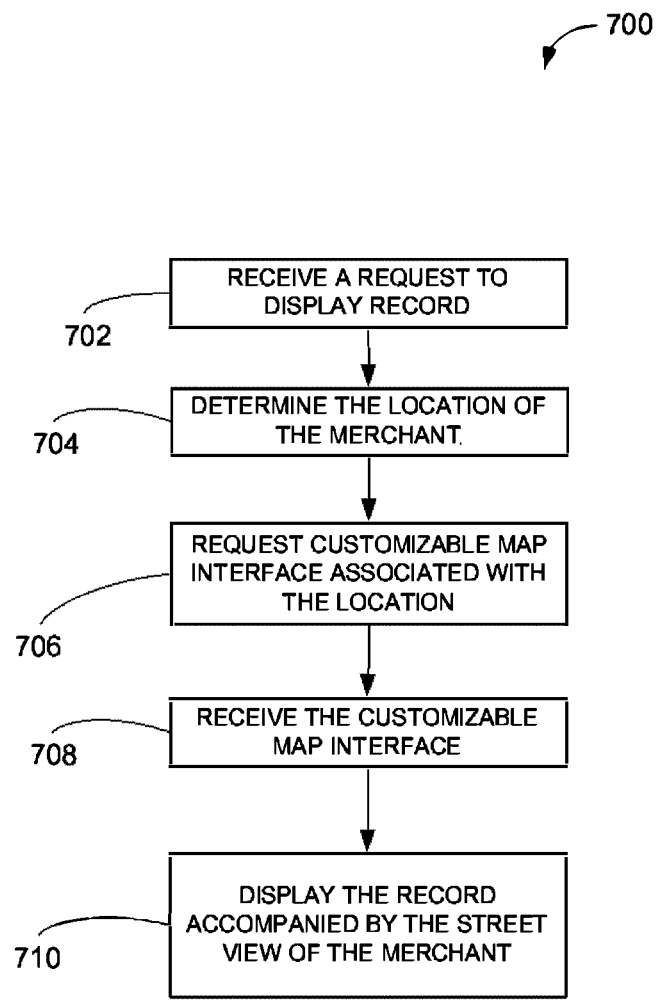
FIG. 7 is a is a flow chart of a method according to an example embodiment.

FIG. 7 illustrates a flow chart of the method 700 for locational visualization of financial statements. The method may commence at 702 with the statement subsystem receiving a request to display a record associated with the financial statement, the record including merchant information of a merchant. At 704, the location extracting subsystem 328 can extract the location of the merchant 120 from the financial statement data. At 706, the mapping API subsystem 330 can request the customizable map interface 454 associated with the location of the merchant 120. At 708, the mapping API subsystem 330 can receive the customizable map interface 454 and at 710, the statement subsystem 322 can display the record accompanied by the street view of the merchant 120. In some example embodiments, the customer's and the merchant's location can be shown alongside or as an overlay of each other.

Figure 8:
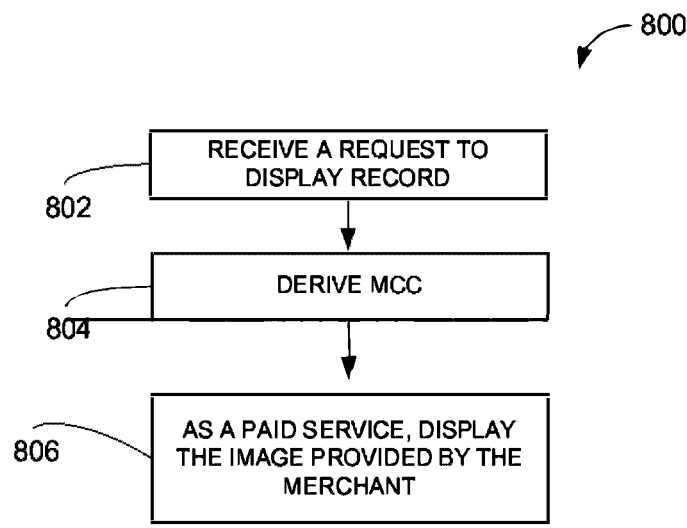
FIG. 8 is a is a flow chart of a method according to an example embodiment.

FIG. 8 illustrates a flow chart of the method 800 for locational visualization of financial statements. The method may commence at 802 with the statement subsystem receiving a request to display a record associated with a financial statement, the record including merchant information A financial statement processed by card networks (e.g., Visa and MasterCard) can be assigned a MCC, a four-digit number that denotes the type of business. MCCs can be used by card issuers to categorize, track or restrict certain types of purchases. At 804, the merchant category subsystem 326 can determine the MCC of the merchant 120. At 806, the statement subsystem 322 can display the image provided by the merchant 120. In some example embodiments, the customizable map interface 456 includes a text stating the merchant's line of business. For example, the text may remind the customer that the merchant sells softballs. In some example embodiments, the merchant can provide an image to be associated with the financial statement record. The image can be, for example, a stylized picture of the merchant's corporate office. In some example embodiments, the image can be provided as part of a commercial arrangement with the merchant in which the merchant pays, for example, a per-click fee.

Figure 9:
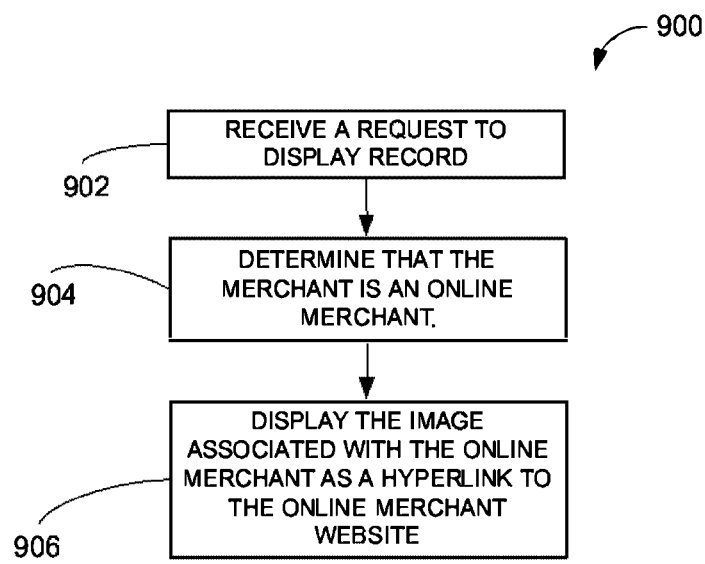
FIG. 9 is a flow chart of a method according to an example embodiment.

FIG. 9 illustrates a flow chart of the method 900 for locational visualization of financial statements. The method may commence at 902 with the statement subsystem 322 receiving a request to display records associated with the financial statement. At 904, the customer information subsystem 324 can determine that the merchant is an online merchant. This determination can be made by querying a database of online merchants. A logo associated with the merchant can be associated with a record of the financial transaction. Additionally, a view of a corporate building of the merchant can be displayed at 906.

It will be noted that the methods and systems described herein are not limited to the financial statements concerning debit and/or credit transactions. The methods described herein can be used to visualize financial statements related, for example, to property and casualty transactions. Thus, the customizable map interface 456 can show the accident location and/or the location of the business where the car is being repaired. The methods described herein can also be utilized to visualize locations of payees in bill payment statements where the location of the payee is shown in the customizable interface 456.

Figure 10:
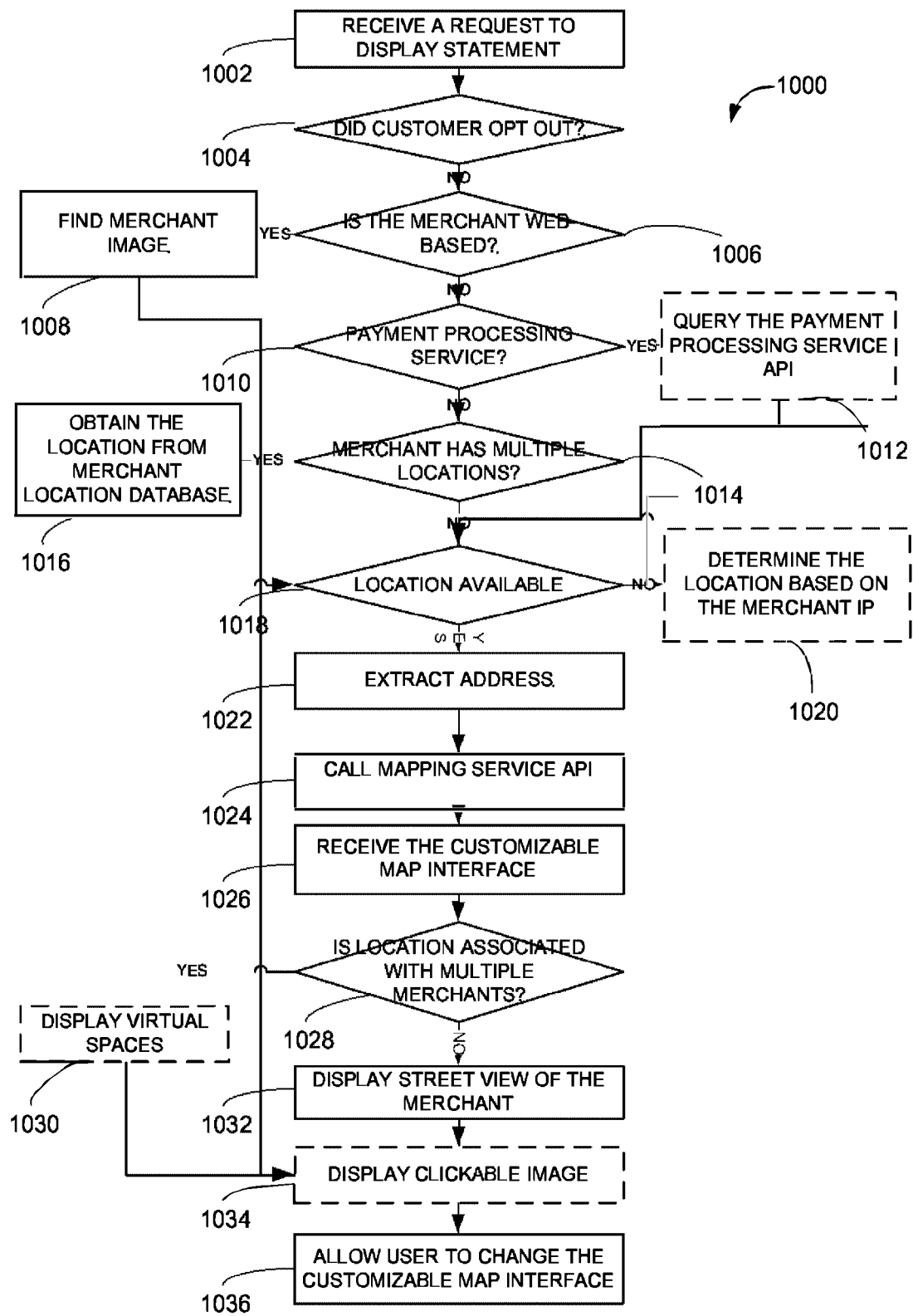
FIG. 10 is a flow chart of a method according to an example embodiment.

FIG. 10 illustrates a flow chart of the method 1000 for locational visualization of financial statements. The method may commence at 1002 with the statement subsystem 322 receiving a request to display a record associated with a financial statement. A customer can be allowed to disable the customizable map interface 456 and/or the image associated with the merchant 120. Accordingly, at 1004 the opt-out subsystem can determine whether the customer has opted out. If it is determined that the customer has opted out, the method 1000 will proceed to display a conventional financial statement without the customizable map interface 456. If, on the other hand, it is determined at 1004 that the customer has not opted out, the method 1000 can proceed to 1006 where it can be determined whether the merchant 120 is the online merchant 140 by comparing the name of the merchant 120 to name of merchants in the database of known online merchants. If the merchant name matches the name of a known online merchant (e.g., Amazon), an image, such as a logo and/or a view of a corporate building of the merchant 120 can be displayed instead of the customizable map interface 456. Additionally, the image 454 can include a hyperlink to the merchant website.

If it is determined that the merchant 120 is the online merchant 140, the method 100 can proceed to 1008 where the image possessing subsystem 334 can find an image associated with the merchant (e.g., a logo). Once the image 454 is found, the method can proceed to display the image 454 at 1034. The image can include a hyperlink to the merchant's website.

If, on the other hand, it is determined at 1006 that the merchant is not an online merchant, the method 1000 can proceed to 1010. In some example embodiments, the statement may include an online payment service (e.g., PayPal) instead of the merchant 120. Transaction identification code may be provided with the transaction, which can be used to query the online payment service. The online payment service can return the transaction details. At 1010, it can be determined whether the merchant 120 is the third party payment processor 150. If the merchant 120 is a payment processing service, the method 1000 can proceed to 1012 where the payment processing service API is the third party payment processor 150 and can be queried by the third party payment subsystem 336. Then the method 1000 can proceed to 1018. If, on the other hand, it is determined at 1010 that the merchant 120 is not the third party payment processor 150, the method 1000 can proceed to 1014 where it can be determined whether the merchant has multiple locations. When the transaction details include the name of merchant 120 with multiple locations and the number of the specific location, the merchant location database can be queried to determine the correct location.

If it is determined that the merchant 120 has multiple locations, the method 1000 can proceed to obtain the correct location from merchant location database at 1016. Then the method can proceed to 1018. If, on the other hand, it is determined that the merchant does not have multiple locations, the method 1000 can proceed to 1018 where it can be determined whether the location is available. If it is determined that the location is unavailable, the method may proceed to 1020 where the location can be determined using the IP of the merchant. If, on the other hand, it is determined that the location is available, the method can proceed to 1022 where the location extracting subsystem 328 can extract the location by any of the above-mentioned methods.

At 1024, the mapping API subsystem can call the mapping service API and at 1026 receive the customizable map interface 456. At 1028, it can be determined whether the location is associated with multiple merchants. If the location is associated with multiple merchants, at 1030, the customizable map interface 456 can be automatically displayed in the virtual space mode. Thus, for example, if the location is a shopping mall, the customizable map interface 456 may attempt to provide a virtual view inside the shopping mall. If, on the other hand, there are no multiple merchants at the location, the method 1000 may proceed to display a street view of the merchant 120 at 1032. If an image is displayed instead or in addition to the customizable map interface 456, at 1034, the image can be displayed. If desirable, at 1036, the customer can be allowed to change setting associated with the customizable map interface 456.

Figure 11:
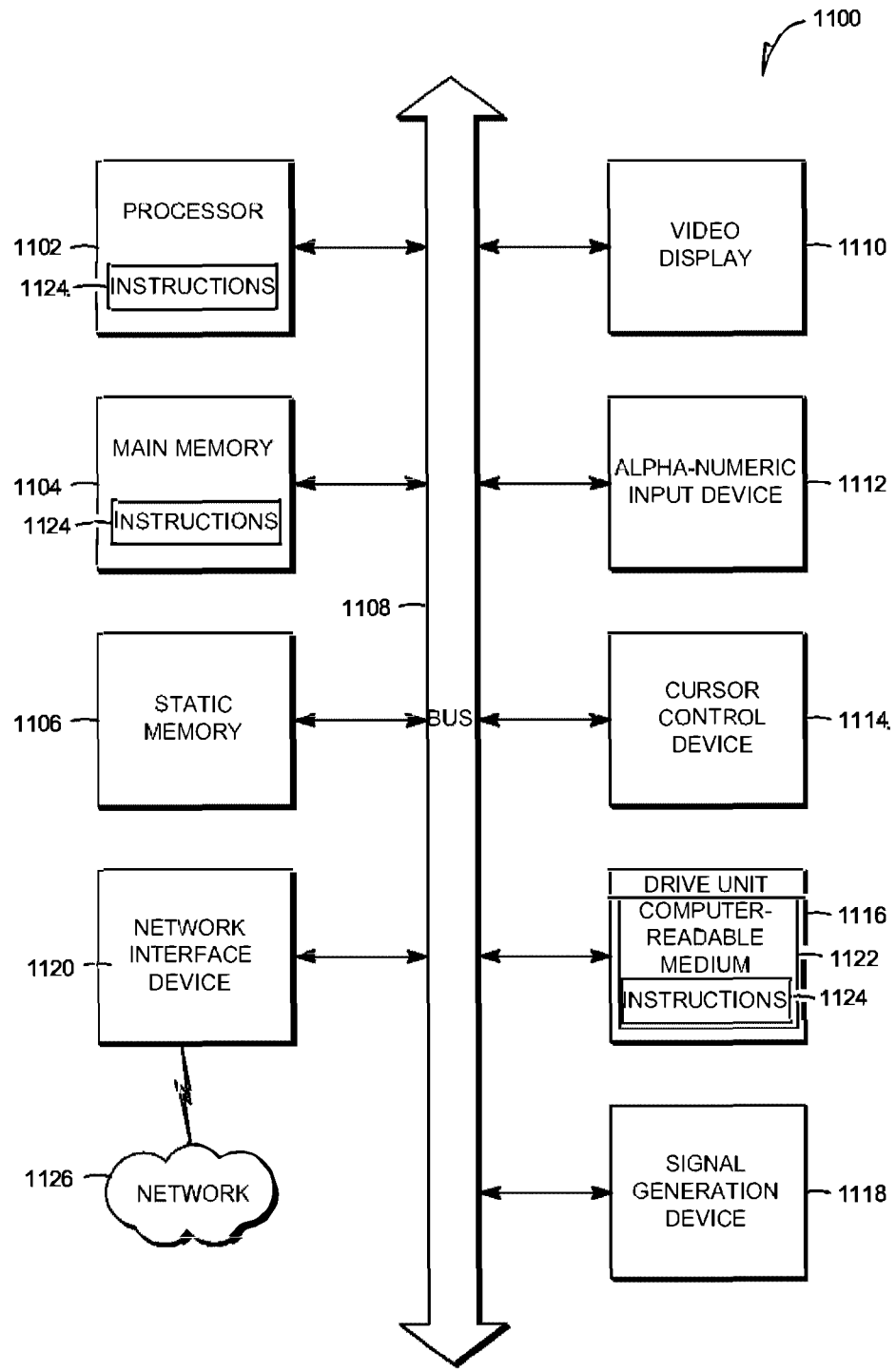
FIG. 11 is a schematic view of a subsystem according to an example embodiment.

FIG. 11 shows a diagrammatic representation of a machine in the example form of a computer system 1100 within which a set of instructions may be executed causing the machine to perform any one or more of the methods—processes, operations, applications, or methodologies discussed herein. The computing systems of the financial institution 300 can include at least one computer system 1100.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU) a graphics processing unit (GPU) or both), a main memory 1104 and a static memory 1106, which communicate with each other via a bus 1110. The computer system 1100 can further include a video display unit 1110 (e.g., a liquid crystal display (LCD) or a cathode ray tube (CRT)). The computer system

1100 also includes an alphanumeric input device 1112 (e.g., a keyboard), a cursor control device 1114 (e.g., a mouse), a drive unit 1116, a signal generation device 1118 (e.g., a speaker) and a network interface device 1120.

The drive unit 1116 includes a machine-readable medium 1122 on which is stored one or more sets of instructions (e.g., software 1124) embodying any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

An example of a mobile device for use with the methods and systems described herein is a self-powered wireless device capable of a wide-area or local wireless communication with a plurality of other hand-held, mobile, self-powered wireless devices or with base stations that are at a fixed location. The hand-held, mobile, self-powered wireless device can contain a memory, a human input device, a display, and an imaging device. The memory stores a plurality of data relating to application data, and other data. Hand-held as used in the present disclosure can be devices small enough to be held in a human's hand. Wireless network as used in the present disclosure can be a wireless network capable of transmitting data over thousands of feet, for example, a wireless telephone network, wireless computer network, or a peer-to-peer network. Self-powered as used in the present disclosure describes a device that will have self-contained power available wherever the user wants to take the device away from a base or stationary source of power. In one example, self-powered devices can be powered by a rechargeable battery, e.g., a lithium-ion battery. In an example, a fuel cell can be the mobile, self-power source. In another example, a mobile device is not a fixed-location equipment such as a desktop personal computer.

Aspects of the embodiments are operational with numerous other general purpose or special purpose computing environments or configurations can be used for a computing system. Examples of well-known computing systems, environments, and/or configurations that may be suitable for use with the embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The communication systems and devices as described herein can be used with various communication standards to connect. Examples include the Internet, but can be any network capable of communicating data between systems. other communication standards include a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Wireless communications can occur over a variety of wireless networks, including: WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. Communications network 22 may yet further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection.

Aspects of the embodiments may be implemented in the general context of computer-executable instructions, such as program modules, being executed by a computer. Generally, program modules include routines, programs, objects, components, data structures, etc. that performs particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

Thus, methods and systems for locational visualization of financial statements have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing detailed description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
   one or more processors; and
   a computer-readable storage medium having instructions stored thereon, which when executed by the one or more processors, cause the system to:
      receive, from a user device, a request to display a record,
      determine whether a merchant associated with the record is web based using merchant information, and displaying a logo of the merchant if the merchant is web based,
      in response to the merchant associated with the record not being web based, determine, from a location database, a location of the merchant using the merchant information, and
      display, on the user device, the location of the merchant on a customizable map interface overlaid with an image identifying the merchant and integrated into the record.

2. The system of claim 1, wherein the instructions, when executed by the one or more processors, further cause the system to enable changing a view mode of the customizable map interface through an Application Programming Interface (API) provided by an online mapping service.

3. The system of claim 1, wherein the instructions, when executed by the one or more processors, further cause the system to derive the location of the merchant from data transmitted by the merchant.

4. The system of claim 1, wherein the record is associated with a financial transaction, and wherein the instructions, when executed by the one or more processors, further cause the system to:
   determine that a party to the financial transaction is a third party payment service, and
   request the third party payment service to provide the location of the merchant using a code associated with the financial transaction.

5. The system of claim 1, wherein the instructions, when executed by the one or more processors, further cause the system to derive the location of the merchant from a merchant location database.

6. The system of claim 1, wherein the instructions, when executed by the one or more processors, further cause the system to obtain the location using an Internet Protocol (IP) associated with the merchant, the location being provided by a service mapping IPs to locations.

7. The system of claim 1, wherein the instructions, when executed by the one or more processors, further cause the system to enable disabling of the customizable map interface.

8. A non-transitory machine-readable medium comprising instructions, which when executed by one or more processors, direct the one or more processors to perform operations comprising:
   Receiving, from a user device, a request to display a record;
   determining whether a merchant associated with the record is web based using merchant information, and displaying a logo of the merchant if the merchant is web based;
   in response to the merchant associated with the record not being web based, determining, from a location database, a location of the merchant using the merchant information; and
   displaying, on the user device, the location of the merchant on a customizable map interface overlaid with an image identifying the merchant and integrated into the record.

9. The non-transitory machine-readable medium of claim 8, wherein the operations further comprise enabling changing a view mode of the customizable map interface through an Application Programming Interface (API) provided by an online mapping service.

10. The non-transitory machine-readable medium of claim 8, wherein the operations further comprise deriving the location of the merchant from data transmitted by the merchant.

11. The non-transitory machine-readable medium of claim 8, wherein the record is associated with a financial transaction, and wherein the operations further comprise:
   determining that a party to the financial transaction is a third party payment service, and
   requesting the third party payment service to provide the location of the merchant using a code associated with the financial transaction.

12. The non-transitory machine-readable medium of claim 8, wherein the operations further comprise deriving the location of the merchant from a merchant location database.

13. The non-transitory machine-readable medium of claim 8, wherein the operations further comprise obtaining the location using an Internet Protocol (IP) associated with the merchant, the location being provided by a service mapping IPs to locations.

14. The non-transitory machine-readable medium of claim 8, wherein the operations further comprise enabling disabling of the customizable map interface.

15. A computerized method comprising:
   receiving, from a user device, a request to display a record;
   determining whether a merchant associated with the record is web based using merchant information, and displaying a logo of the merchant if the merchant is web based;
   in response to the merchant associated with the record not being web based, determining, from a location database, a location of the merchant using the merchant information; and
   displaying, on the user device, the location of the merchant on a customizable map interface overlaid with an image identifying the merchant and integrated into the record.

16. The computerized method of claim 15, further comprising enabling changing a view mode of the customizable map interface through an Application Programming Interface (API) provided by an online mapping service.

17. The computerized method of claim 15, further comprising deriving the location of the merchant from data transmitted by the merchant.

18. The computerized method of claim 15, wherein the record is associated with a financial transaction, and wherein the method further comprises:
   determining that a party to the financial transaction is a third party payment service, and
   requesting the third party payment service to provide the location of the merchant using a code associated with the financial transaction.

19. The computerized method of claim 15, further comprising deriving the location of the merchant from a merchant location database.

20. The computerized method of claim 15, further comprising obtaining the location using an Internet Protocol (IP) associated with the merchant, the location being provided by a service mapping IPs to locations.

\* \* \* \* \*